United States Patent [19]
Slosiarek et al.

[11] 3,847,228
[45] Nov. 12, 1974

[54] HITCH SWAY LIMITING DEVICE

[75] Inventors: Michael L. Slosiarek, Milwaukee, Wis.; Richard E. Gatch, Gering, Nebr.

[73] Assignee: Allis-Chalmers Manufacturing Company, Milwaukee, Wis.

[22] Filed: Oct. 26, 1970

[21] Appl. No.: 84,083

[52] U.S. Cl............... 172/450, 280/446 R, 280/474
[51] Int. Cl......................................... A01b 59/043
[58] Field of Search............. 280/474, 446; 172/450

[56] References Cited
UNITED STATES PATENTS
2,935,145   5/1960   DuShane et al. .................. 172/275
2,935,147   5/1960   Edman .............................. 172/450
2,987,126   6/1961   Horney ............................. 172/450
3,047,076   7/1962   Wier et al. ........................ 172/450
3,627,060  12/1971   Lemmon ........................... 172/450
3,709,304   1/1973   Haupt ............................... 172/450

*Primary Examiner*—Leo Friaglia
*Attorney, Agent, or Firm*—Arthur L. Nelson

[57] ABSTRACT

A three-point hitch sway limiting device having sway blocks engaging reversible wear plates carried on the lower draft arms.

11 Claims, 7 Drawing Figures

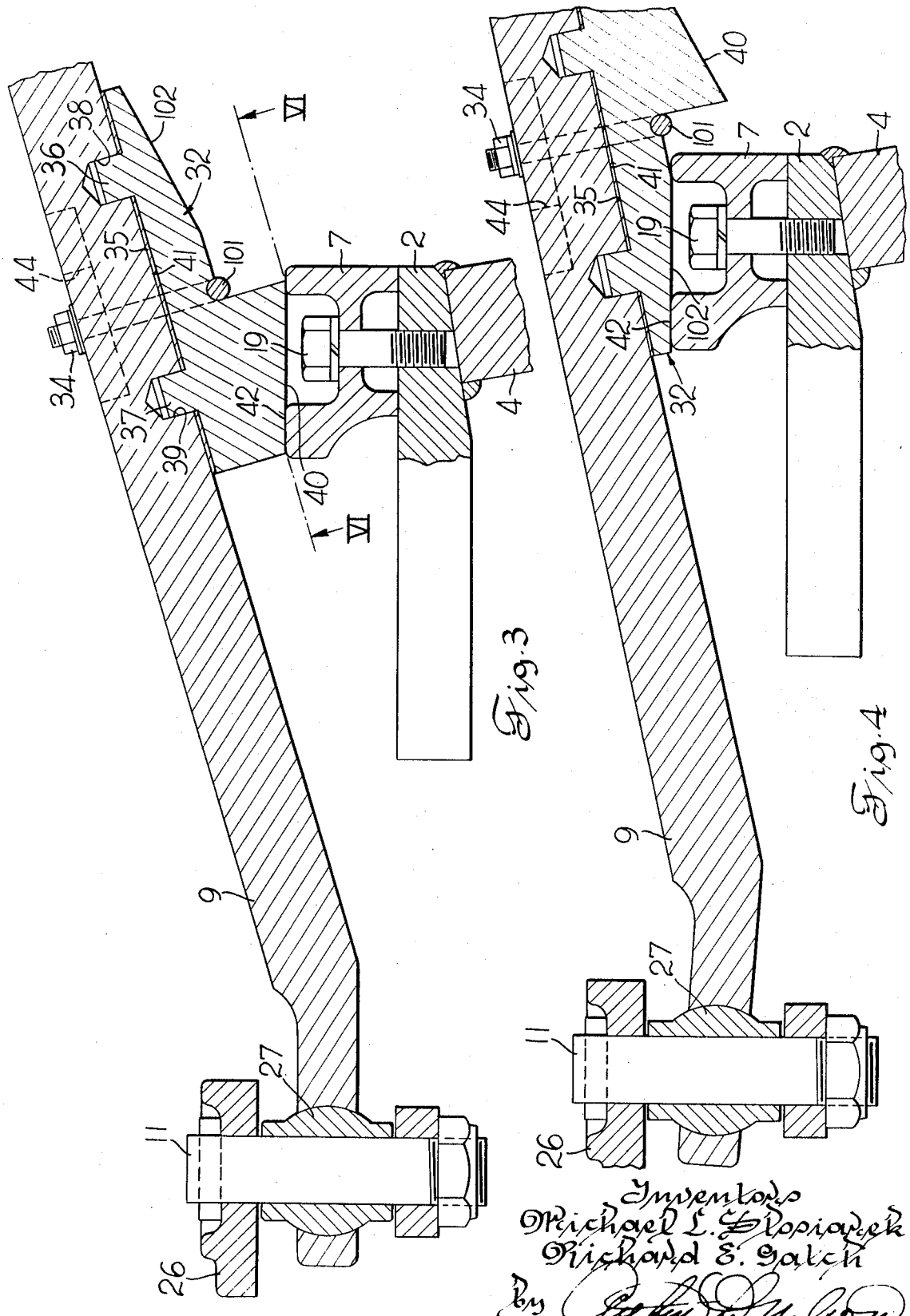

HITCH SWAY LIMITING DEVICE

This invention relates to a three-point hitch and more particularly to a sway limiting device including reversible wear plates on the lower draft arms for engaging two piece sway blocks carried on the draw bar hanger bracket.

The use of a tractor mounted three-point hitch including two lower draft arms and an upper link provides a connection between the tractor and the implement. The link and the draft arms are permitted to have a certain amount of lateral sway through the universal connections between the tractor and the implement. A certain amount of lateral sway of the three-point hitch is tolerated but excessive sway presents a problem even with the trail behind type of implement. Accordingly three-point hitch linkages are constructed to permit a limited lateral movement of the implement relative to the tractor.

A sway limitor usually consists of a draft arm contacting sway control member associated with the tractor which are either adjustable, repositionable, or removable so as to position the sway control blocks for limiting the lateral swinging of the links either throughout their full range of vertical movement or only at generally the upper end of such range of vertical movement. Sway control blocks of this type provide a means to accomodate receiving implements having different lateral spacing between the draft arms attaching points thereon. Means of this character generally have taken the form of sway blocks of different sizes or configuration which are expensive and were difficult and time consuming to adjust or replace.

Accordingly this invention provides a simple easily changeable sway limiting device which includes parts that are small and readily changeable. Accordingly this sway limiting device overcomes the disadvantages indicated above of the conventional sway limiting device.

It is an object of this invention to provide a sway limiting device on a tractor three-point hitch.

It is another object of this invention to provide a sway limiting device having a two-piece sway block carried upon support brackets of the tractor and reversible wear plates on the lower draft arms for engaging the sway blocks.

It is a further object of this invention to provide a sway limiting device for a tractor three-point hitch having a draw bar hanger bracket supporting a two piece sway block for engaging a reversible wear plate on each side of the tractor to selectively provide proper spacing for the category 2 or category 3 type hitch on an implement.

It is a further object of this invention to provide a sway limiting device for a tractor three-point hitch including two piece sway blocks removably mounted on hanger brackets with means removably fastened on the lower sway block to the upper sway block whereby removal of the lower sway block permits greater lateral movement of the implement while the draft arms are in the lower operating position and restricts the lateral movement of the draft arms when in the upper or implement carrying position on the tractor.

The objects of this invention are accomplished by mounting two piece sway blocks on the draw bar hanger brackets. The draw bar hanger brackets are spaced laterally relative to each other with a cross bar for supporting a swinging draw bar. The two piece sway blocks extend along the outboard lateral surfaces of the hanger brackets and are provided with means for fastening the upper and lower sway blocks on each side of the hanger brackets. The lower draft arms of a three-point hitch are universally connected on their forward end to permit the swaying movement of the draft arm and are adapted for connection on their rear ends to an implement of a predetermined connecting space. A wear plate is positioned on the intermediate portion of each of the draft arms to engage wear surfaces on the two piece sway blocks. The sway blocks can be reversed 180° to vary the spacing between the draft arm and the sway block and accordingly as required for the lateral spacing of the draft arm connections to the implement. The lower sway block may be removed to permit greater swaying movement of the draft arms when in the operating position and for limited sway of the draft arm when in the upper or implement carrying position. The sway limiting device provides a means for adjusting the sway restriction in accordance with the requirements of the type implement coupled to the tractor and also it provides a quick setting for the category 2 or category 3 type connection between the tractor and implement.

The preferred embodiments of this invention are illustrated in the attached drawings.

FIG. 3 is a partial section view taken on line III—III of FIG. 5;

FIG. 4 is a view similar to FIG. 3 in which the wear plate is reversed to reduce the degree of divergence of the lower draft arms for narrower hitching dimension of the implement;

Figure 1:
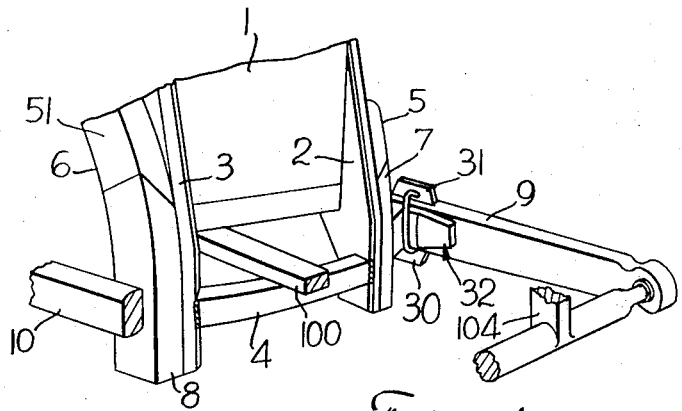
FIG. 1 illustrates a fragmentary three dimensional view of a three-point hitch.

Referring to FIG. 1 the rear axle housing 1 is shown supporting the draw bar hanger brackets 2 and 3 which are welded to a cross bar 4 supporting a draw bar 100. An upper sway block 5 is mounted on the right hand side of the hanger bracket 2 while the upper sway block 6 is mounted on the left hand side of the hanger bracket 3. A lower sway block 7 engages the upper sway block 5 and also engages the right hand side of the hanger bracket 2. The lower sway block 8 engages the left hand side of the hanger bracket 3 and engages the upper sway block 6. The lower draft arms 9 and 10 extend forwardly for universal connection with a spherical bushing carried on the shaft 11 on the tractor. The rear end of the lower draft arms are connected to an implement 104 having predetermined fixed lateral dimensions for category 2 or 3 hitches.

The tractor 12 carries the rock shaft 13 for pivoting the crank 14 which is connected to the lift link 15. The lift link 15 is connected to the lower draft arm 10 and includes a connection 16 for coupling to an implement.

Figure 2:
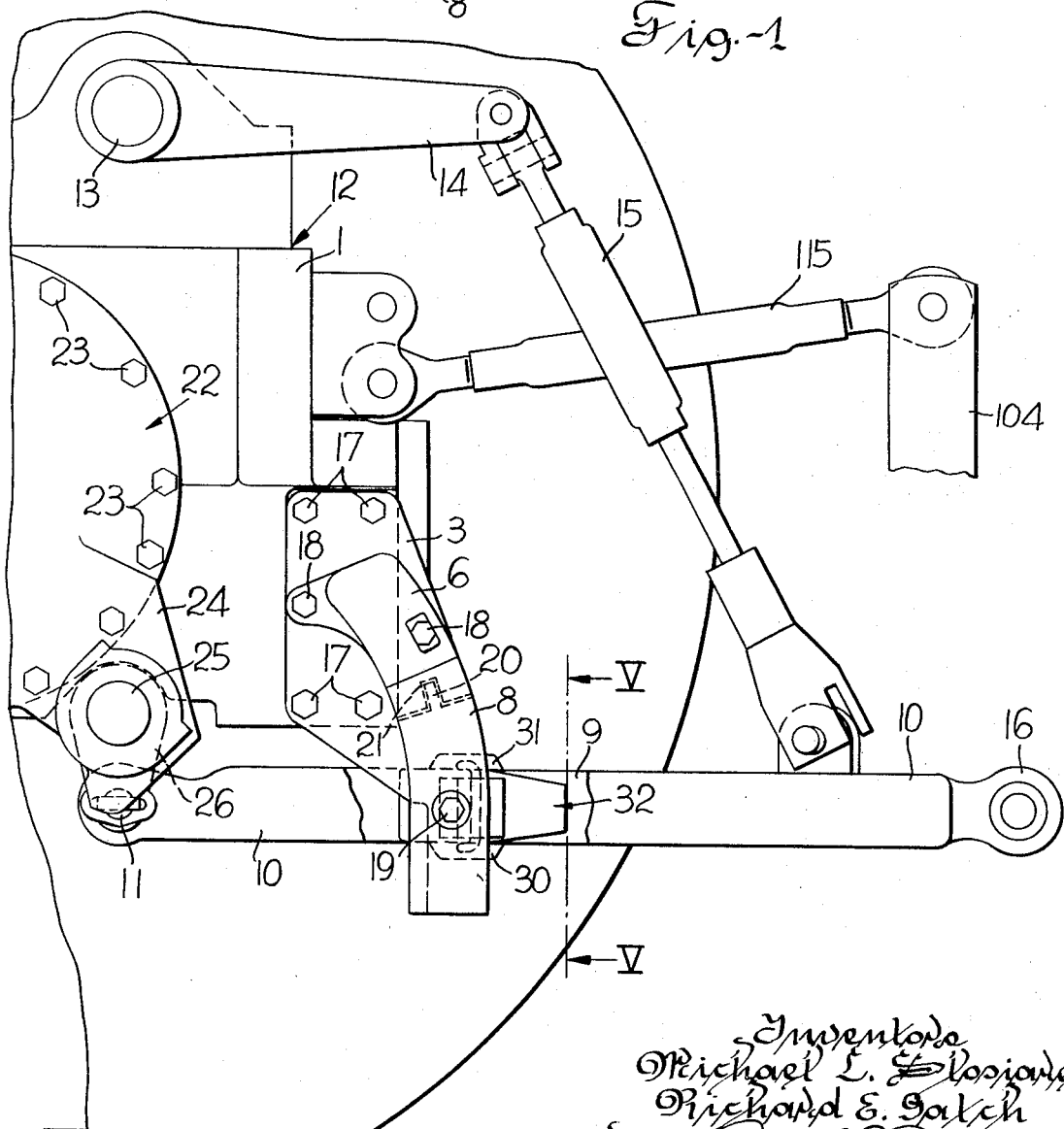
FIG. 2 is a side view of a three-point hitch and the sway limiting device on a tractor.

The rear axle housing 1 is shown in FIG. 2 supporting the hanger bracket 3 which is connected by a plurality of bolts 17. The upper sway block 6 is fastened by the bolts 18. The lower sway block 8 is connected by means of bolt 19. The lower sway block 8 is formed with a lug 20 adapted for reception within a slot 21 on the upper sway block 6. The end plate 22 is fastened to the drive shaft housing by a plurality of bolts 23. The plate 22 also forms the flange 24 for supporting the torsion bar 25 connected to the shaft 11 through the lever 26 to operate the hydraulic weight distribution system.

Referring to FIG. 3 the draft arm 9 is connected to the spherical bushing 27 for universal rotation of the draft arm 9. The bushing 27 is carried on the shaft 11 which in turn is connected to the lever 26 creating a torque in the torsion bar 25 in response to the draft load.

The draft arm 9 carries a wear plate 32 which is shown in FIG. 3. Flanges 30 and 31 are welded to draft arm 9. The flanges 30 and 31 form slots 44 for receiving the U-bolt 101 which extends around the wear plate 32. The U-bolt stays clamped around the wear plate 32 by the nuts 33 and 34. The wear plate 32 is clamped against a spacer 35 which is selected at the factory to provide the proper clearance between the wear plates and the sway block. This is an optional feature.

The wear plate 32 is formed with the protrusions 36 and 37 which extend into the mating holes 38 and 39 which prevent rotation of the wear plate on the draft arm 9.

The wear plate is formed with the inclined surfaces 102 and 40 a predetermined distance from the lateral surface 41 on a side of the draft arm 9. The surfaces 102 and 40 are inclined to the lateral surface 41 since the draft arms 9 and 10 diverge from their point of connection with the tractor. The inclined surface 40 engages the surface 42 on the outboard side of the sway block 7 to position the ends of the lower draft arms for connection to category 3 type implements as shown in FIG. 3. Sway block 7 is fastened by the bolt 19 to the hanger bracket 7.

FIG. 4 shows the wear plate 32 reversed 180° wherein the U-bolt 101 is in the right hand end of the slot 44. The wear surface 102 engages the surface 42 of the lower sway block 7 to position the ends of the lower draft arms for connection to category 2 type implements.

Figure 5:
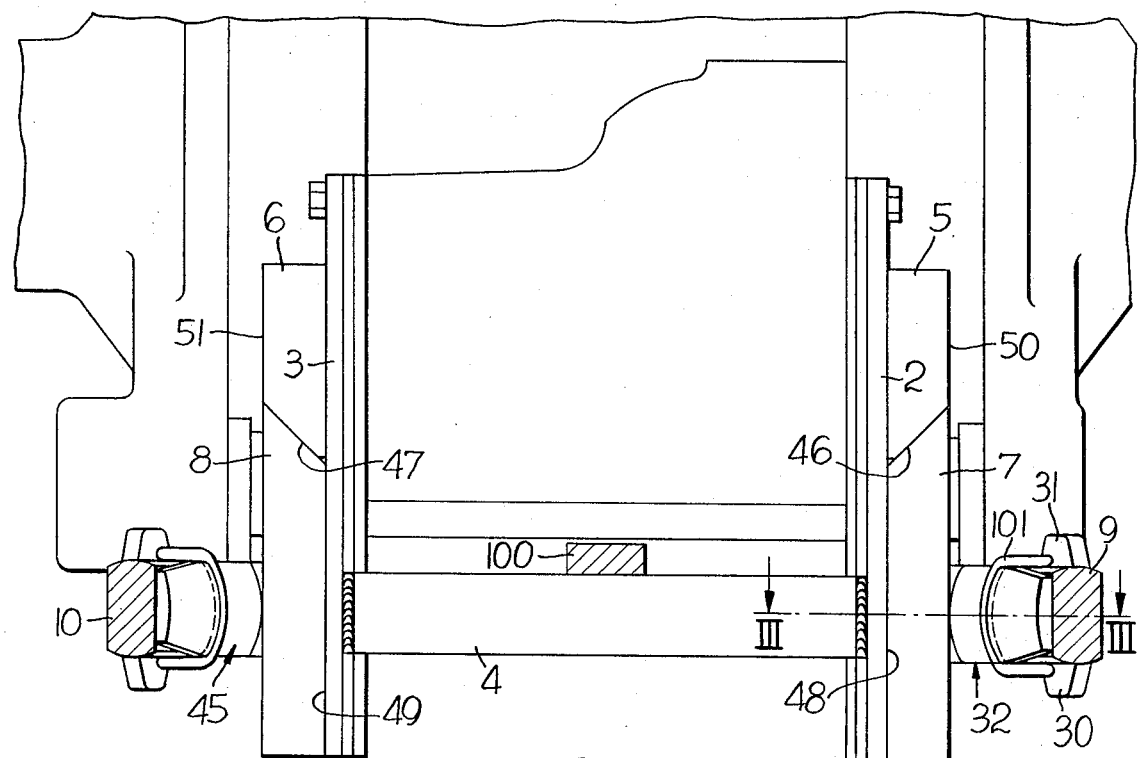
FIG. 5 is a rear view of a three-point higch and the sway limiting device with the draft arms in cross-section taken on line V—V of FIG. 2.

FIG. 5 shows a rear view of the three-point hitch and the draft arms in sections. The wear plate 32 is shown connected to the draft arm 9 while the wear plate 45 is connected to the draft arm 10. It is noted that in FIG. 5 the lower sway blocks 7 and 8 can be removed from the hanger brackets 2 and 3. The ramp surface 46 of the upper sway block 5 and the ramp surface 47 of the upper sway block 6 then cause a limiting of the swaying movement of the draft arms 9 and 10 when the lower draft arms 9 and 10 are in the raised or traveling position for the implement. When the lower sway blocks 7 and 8 are removed and the draft arms 9 and 10 are in the lowered position as shown in FIG. 5 wear plates 32 and 45 engage the surfaces 48 and 49 and permit an increased swaying movement of the draft arms 9 and 10. The removal of the lower sway blocks 7 and 8 is used for all implements in which greater freedom of movement laterally of the implement is desired.

Figure 6:
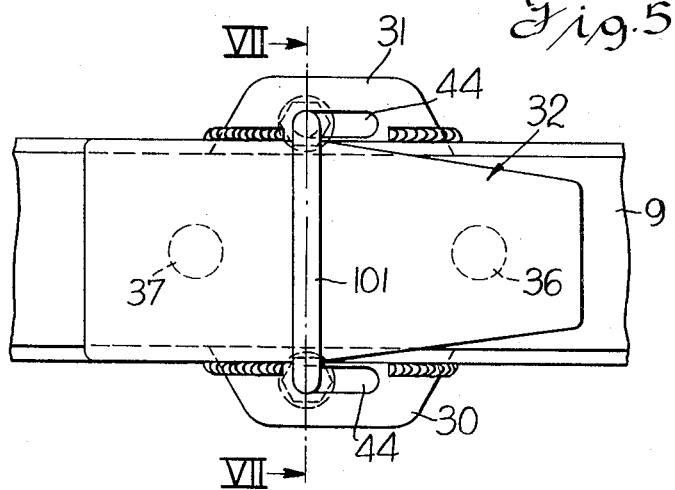
FIG. 6 is a side view of the wear plate illustrating its mounting on the lower draft armtaken on line VI—VI of FIG. 3.
Figure 7:
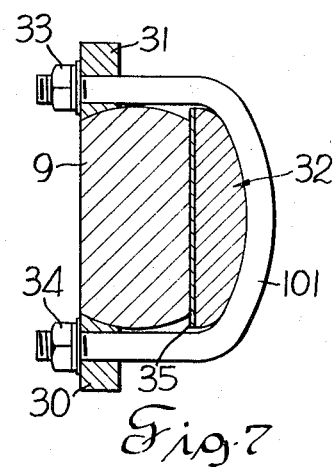
FIG. 7 is a cross-section view taken on line VII—VII of FIG. 6.

Since the upper sway blocks 5 and 6 remain on the side of the hanger brackets 2 and 3 the surfaces 50 and 51 control the lateral sway when the draft arms 9 and 10 are in the raised position and the implement is in the travel position such as traveling on a road. FIGS. 6 and 7 illustrate the wear plate 32 on the draft arm 9. The slots 44 in flanges 30 and 31 receive the U-bolt 101 for fastening on the side of the draft arm 9.

The operation of the sway limiting device will be described in the following paragraphs.

The three-point hitch of the tractor includes the lower draft arms 9 and 10 and the upper link 115. The implement is connected to the upper link 115 and the lower draft arms 9 and 10 in the normal operating position. The sway of the draft arms 9 and 10 is limited depending upon the positioning of the wear plates 32 and 45 and which category of implement is connected to the draft arms and upper link. In the position as shown in FIG. 5 the wear plates are positioned for the category 3 type implement wherein a greater spacing is provided between the rear ends of the draft arms 9 and 10. A limited amount of sway is permitted when the implement is connected and the draft arms are in this operating position.

When it is desired to connect to the tractor a category 2 type implement the wear plates 32 and 45 are reversed 180° to the position as shown in FIG. 4. FIG. 4 shows the wear plate permitting a narrower implement connecting dimension between the rear ends of the draft arms. In the category 2 type connection the surface 102 of the wear plate 32 engages the surface 42 of the sway block 7 in contrast to the surface 40 engaging the surface 42 of the sway block 7 in the category 3 type connection. The wear plates 32 and 45 are provided with protrusions which maintain a nonrotatable position of the wear plate when the U-bolt 101 fastens it to the draft arm and thereby fixing the wear plate in either of the two positions as shown.

Trail behind implements usually are operated with a greater amount of sway of the implement during operation. Accordingly, the lower sway blocks 7 and 8 are removed by loosening the bolt 10. This permits the wear plate to engage the surfaces 48 and 49 on the hanger brackets 2 and 3 and greater sway of the vehicle is permitted to provide the desired operation.

When the implement is raised to the traveling position the sway on the implement is limited. In the raised or travel position of the implement the draft arms are lifted by the lift links. Rock shafts 13 and the crank arms 14 rotate causing the lower draft arms 9 and 10 to raise. The wear plates engage the lower sway blocks 7 and 8 or hanger brackets 2 and 3 when they are in operating position and in raised position they move upwardly to engage the surfaces 50 and 51 of the upper sway blocks 5 and 6 to engage the surfaces 50 and 51 which restrict sway of the implement during travel. It is understood that an implement is attached to the draft arms and upper link. The implement maintains a fixed dimension between the draft arms so one of the wear plates engaging a sway block is all that is necessary to control sway at any particular time.

The embodiments of the invention in which an exclusive property or privilege is claimed are defined as follows:

1. A sway limiting device for a three-point tractor hitch comprising, a vehicle chassis, a pair of laterally spaced brackets mounted on said vehicle chassis, a pair of lower draft arms universally connected to said vehicle chassis and connected to an implement, a two piece sway block with each piece removably mounted on each of said brackets, a reversible wear plate removably mounted on each of said draft arms for selectively engaging each of said sway blocks, said wear plates having predetermined thicknesses defining wear surfaces spaced laterally at predetermined dimensions relative to the lateral mounting surface of said wear plate on said draft arms thereby provide predetermined sway restriction and selectively alternative lateral operating spaces between said draft arms.

2. A sway limiting device for a three-point tractor hitch as set forth in claim 1 wherein each of said two-piece sway block includes an upper sway block defining a wear surface for limiting vehicle sway when said draft arms are in an upper position, a lower sway block adapted for restricting sway of the implement when said draft arms are in a lower position.

3. A sway limiting device for a three-point tractor hitch as set forth in claim 1 wherein each of said two-piece sway blocks include a lower sway block, removable fastening means fastening said lower sway block and permitting removal of said lower sway block to thereby permit greater sway of said draft arms when the draft arms are in the lower operating position.

4. A sway limiting device for a three point tractor hitch as set forth in claim 1 wherein each of said wear plates includes a spacer selectively positioned between said wear plate and said draft arm to thereby selectively position the rear ends of said draft arms in selective predetermined transverse spacing.

5. A sway limiting device for a three-point tractor hitch as set forth in claim 1 wherein said brackets on said vehicle include draw bar hanger brackets adapted for supporting a draw bar.

6. A sway limiting device for a three-point tractor hitch as set forth in claim 1 wherein each of said two-piece sway blocks form an upper sway block defining a sway limiting surface for the draft arm in the upper position and a ramp surface connecting said sway limiting surface and extending downwardly therefrom, a lower sway block having a surface complementary to said ramp surface and means for fastening said lower sway block to said bracket.

7. A sway limiting device for a three-point tractor hitch as set forth in claim 1 wherein said lower draft arms define divergent center lines relative to each other, said wear plates and said sway blocks define engaging surfaces substantially parallel relative to each other.

8. A sway limiting device for a three-point tractor hitch as set forth in claim 1 wherein said wear plates define surfaces for engaging said draft link having protrusions extending therefrom, said draft links define surfaces for engaging said wear plates forming recesses for receiving said protrusions on said wear plates, fastening means for removably fastening said wear plates to said draft arms.

9. A sway limiting device for a three-point tractor hitch as set forth in claim 1 wherein said two-piece sway block includes an upper sway block defining a slot, a lower sway block defining a lug for reception in said slot, a fastening element for fastening said lower sway block on said bracket while said lug prevents relative rotation between said upper and said lower sway blocks.

10. A sway limiting device for a three-point tractor hitch as set forth in claim 1 wherein said two-piece sway block includes a lower sway block, fastening means for selectively removing said lower sway block, said bracket defining a wear surface for engaging said wear plate when said draft arms are in the lower position, an upper sway block defining a ramp and a wear surface adapted for restricting the sway of the draft arms when said draft arms are in the upper position and said wear plates engage the wear surface on said upper sway block.

11. In an implement hitch for a tractor having a pair of laterally spaced draft links connected for lateral and vertical swinging movement relative to the tractor and having inwardly facing, opposed surfaces, a sway control mechanism including opposite, generally upright, laterally outwardly facing bearing surfaces on the tractor between the draft links and a pair of bumpers including contact surfaces, being adjustably mounted on said draft links for selectively disposing selected portions of said contact surfaces in operative positions in confronting relationship to said bearing surfaces, the dimensions of said bumpers being such that their respective contact surface portions, when respectively in said operative positions, bear different spatial relationships relative to said inwardly facing surfaces of said draft links.

* * * * *